United States Patent [19]
Sherman

[11] 4,020,559
[45] May 3, 1977

[54] BEARING COMPASS
[75] Inventor: Allen Butman Sherman, Pembroke, Mass.
[73] Assignee: E. S. Ritchie & Sons, Inc., Pembroke, Mass.
[22] Filed: Dec. 22, 1975
[21] Appl. No.: 643,313
[52] U.S. Cl. .............................. 33/272
[51] Int. Cl.² .................................. G01C 17/12
[58] Field of Search .................. 33/272, 273, 241
[56] References Cited
UNITED STATES PATENTS

| 567,867 | 9/1896 | Schmidt | 33/272 |
|---|---|---|---|
| 2,472,809 | 6/1949 | Decker | 33/241 |
| 2,680,297 | 6/1954 | Vaucher | 33/272 |
| 3,191,306 | 6/1965 | Kierans | 33/273 |
| 3,613,251 | 10/1971 | Fitzpatrick et al. | 33/272 |

Primary Examiner—Steven L. Stephan
Attorney, Agent, or Firm—Thompson, Birch, Gauthier & Samuels

[57] ABSTRACT

A portable hand-held compass for taking navigational bearings on distant objects during the day or at night. The compass has a hollow housing in which a compass card is mounted for rotation about a vertical axis, a viewing window in the housing through which compass readings are taken, and a sighting barrel incorporated in the housing for viewing a distant object along a horizontal viewing path. The compass also has a manually activated light emitting diode for illuminating a reticle, a semi-reflective mirror positioned across the sighting path for reflecting an image of the illuminated reticle to the eyepiece of the sighting barrel, means for automatically unclamping the compass card when the L.E.D. is activated, and means for automatically clamping the compass card when the L.E.D. is deactivated.

9 Claims, 4 Drawing Figures

BEARING COMPASS

BACKGROUND OF THE INVENTION

This invention relates to hand-held bearing compasses of the type employed, for example, in taking navigational bearings for fixing the position of a vessel at sea. Bearing compasses of this general type are well known and are shown in U.S. Pat. Nos. 567,867; 2,396,202; and 3,613,251. Optical accessories used to assist in sighting a gun are shown in U.S. Pat. Nos. 2,472,809; 3,524,710; and 3,645,635.

Objects of the present invention are to provide a portable hand-held bearing compass which is compact, reliable, accurate and easily used under both ideal and adverse conditions of ambient light and motion.

SUMMARY OF THE INVENTION

According to the present invention, a portable, hand-held bearing compass for use during day or night is provided comprising a hollow housing; a magnetic compass mounted in said housing, said compass having a compass card mounted for rotation about a vertical axis; a viewing window provided in said housing through which compass readings can be taken; a sighting barrel having an eyepiece, said barrel being associated with said housing for viewing a distant object along a horizontal sighting path; a reticle mounted within said housing offset from said sighting path; manually activated means for illuminating said reticle; a semi-reflective mirror positioned within said sighting barrel across said sighting path, said mirror being angled to reflect the image of said illuminated reticle along said sighting path towards said eyepiece while permitting a distant object to be viewed along said sighting path through said eyepiece; means for automatically unclamping said compass card when said reticle illumination means is manually activated; and means for automatically clamping said compass card when said reticle illumination means is manually deactivated.

Preferably, the reticle is a dot, the manually activated means for illuminating the reticle is a switch which energizes a light source, the light source is a light-emitting diode emitting light having a wave length longer than green light, and the manually activated switch also depresses a lever arm against a biasing spring to unclamp the compass card. It is further preferred that the bearing compass includes manually activated means for lighting the compass card at night, and light filter means manually movable between an operative position across the sighting path and an inoperative position offset from the sighting path to alter the contrast between the reticle image and the distant object image as viewed through the eyepiece, the semi-reflective mirror being located between the eyepiece and the operative position of the light filter.

DESCRIPTION OF THE PREFERRED EMBODIMENT

Figure 1:
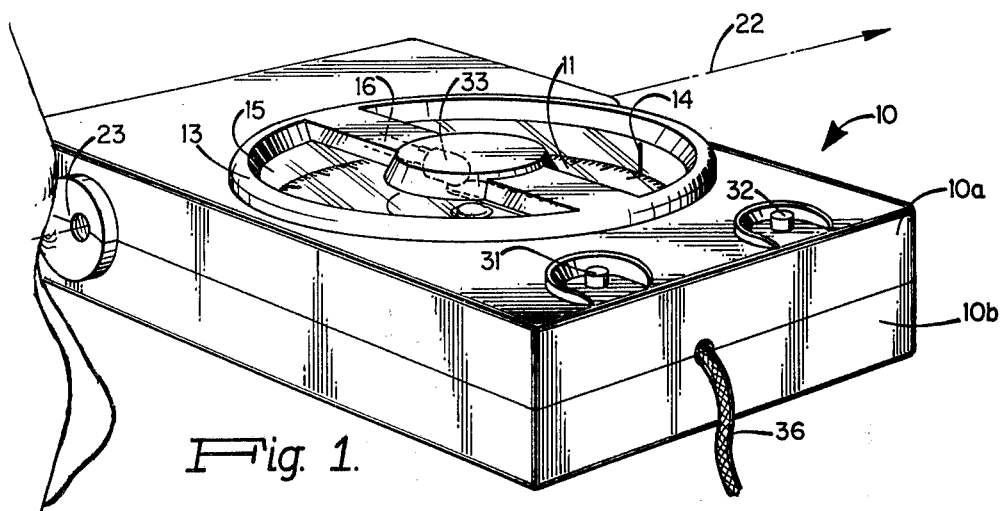
FIG. 1 is a perspective view of the preferred embodiment of the bearing compass of this invention. A person is shown looking through the sighting barrel eyepiece.

Referring to the drawings, the bearing compass of this invention includes a housing 10 having a top portion 10a and a bottom portion 10b which are fastened together. A compass card 11 is mounted in housing 10 for rotation about a vertical axis and into alignment with the earth's magnetic field. Compass card 11 rotates within the periphery of bowl 12 which is fixed by two bolts 40 to the underside of top housing portion 10a. The interior surface of bowl 12 is provided with a vertical lubber line 14 which facilitates the taking of compass readings. The top housing portion 10a is provided with a raised rim 13 which secures a protective viewing window 15 through which compass readings can be taken. Compass card 11 has a conventional construction and is preferably provided with unshown means for the rapid damping of oscillations.

Compass card 11 is normally clamped against its lower support by means of a pivoting lever 16. The lever has an unusual shape including a horizontal inner portion 41, a horizontal outer portion 42, and a connecting vertical portion 43. The inner portion 41 is pivoted on two fulcrum points 17 and 18 which are located on the upper edge of bowl 12. Inner portion 41 extends over the compass card and is normally urged downwardly against the hub of the compass card to clamp the card against rotation. Biasing leaf spring 21 provides this normal urging force by pressing against the underside of outer portion 42.

A hollow sighting barrel 19 is formed within housing 10 and has an eyepiece 23 and an object window 24 through which a distant object 25 can be viewed along a horizontal sighting path 22. It is preferred that sighting path 22 be parallel to an imaginary line running between the center of the compass card to the lubber line 14. Thus, the compass will provide the user with a reading of the magnetic bearing of the distant object 35 being viewed along the sighting path 22.

In order to assist in sighting along the sighting path 22, a reticle 25 is mounted in housing 10 offset from the sighting path. The reticle comprises an opaque plate which has a small aperture formed therein. To illuminate the reticle, a light-emitting diode 26 (commonly called an L.E.D.) is mounted behind the reticle and produces red light or colored light having a wave length longer than green light. The L.E.D. 26 is powered by dry cell batteries 27 and 28. Alternatively, an exposed colored fluorescent surface can be substituted for diode 26.

A manually depressible switch 31 is electrically connected to energize the L.E.D. when the switch is depressed, and to de-energize the L.E.D. when the switch is released. When the L.E.D. is energized, it shines through the reticle aperture creating a reticle image 45 which is projected along L.E.D. path 44 through a lens 29, which is preferably a collimating lens.

Figure 3:
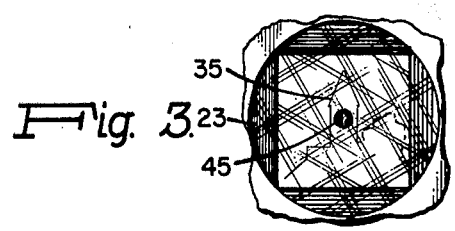
FIG. 3 is an elevational view looking through the eyepiece of the bearing compass. The view through the eyepiece shows the superimposed distant object image and reticle image.

The purpose of the optical system of this invention is to superimpose the reticle image 45 on the viewed image of the distant object 35 as seen through the sighting barrel eyepiece 23 (see FIG. 3). To accomplish this, the lighted reticle image 45, which is projected along L.E.D. path 44, is reflected by a semi-reflective mirror 30 so that the reflected L.E.D. path 44 is precisely coincidental with the sighting path 22 as viewed through eyepiece 23. This is accomplished by positioning the mirror 30 across the sighting path 22 so that sighting path 22 and L.E.D. path 44 impinge upon the mirror at equal acute angles.

Semi-reflective mirror 30 has a thin coating which is partly reflecting and partly transmitting whereby light from a distant object 35 can pass through object window 24, through mirror 30 and to eyepiece 23, and whereby light from L.E.D. 26 can pass through lens 29, and be reflected by mirror 30 to eyepiece 23. Preferably, the thin mirror coating is of the dichroic type which transmits light having a relatively short wave length (such as green or blue) whereas it reflects light having a relatively long wave length (such as red).

When the bearing compass is not being used, the manual switch 31 remains open. Thus, L.E.D. 26 is not energized and lever 16 is urged by spring 21 into clamping relation with compass card 11 to immobilize the compass card. In use, manual switch 31 is depressed and closed to energize the L.E.D., and lever 16 is raised clear of the compass card permitting the card to freely rotate.

An additional manual switch 32 is provided to electrically connect bulb 33 to batteries 27, 28. Bulb 33 is positioned to illuminate compass card 11 for reading at night.

To operate the bearing compass of this invention, the user holds the compass horizontally with his eye pressed against the eyepiece 23 as shown in FIG. 1. The user views a distant object along sighting path 22 and manually depresses switch 31 with his finger. This action causes the compass card to rotate and causes L.E.D. 26 to light. The user sees the superimposed reticle image and distant object image as shown in FIG. 3. When the distant object and the reticle dot are in alignment, the user waits a few seconds for the card to stop rotating and then releases switch 31. This action causes the L.E.D. to be deactivated, and causes the compass card 11 to be clamped against rotation. The user then lowers the compass from his eye and reads the magnetic bearing of the distant object through viewing window 15 by observing the alignment of the compass card 11 with the lubber line 14.

Figure 2:
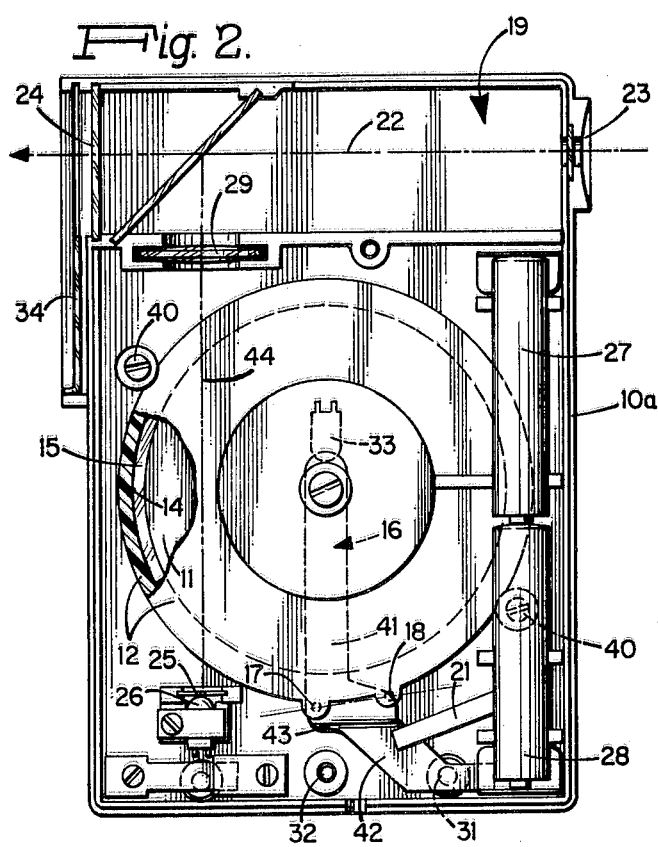
FIG. 2 is a bottom view of the bearing compass of FIG. 1 with the bottom cover removed and some parts shown in section.
Figure 4:
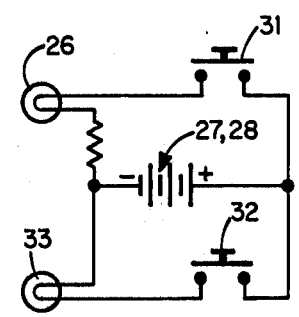
FIG. 4 is a diagram illustrating the electrical circuit by which the reticle and the compass card are illuminated.

The user can also depress switch 32 to illuminate the compass card for viewing through window 15. This feature is useful during conditions of darkness. The user can also slide a filter 34 from an inoperative position offset from the sighting path 22 (see FIG. 2) to an operative position across the sighting path. Filter 34 is useful to decrease the brilliance of the distant object 35 during conditions of extreme brightness. Finally, for purposes of security, a looped cord 36 is attached to housing 10 so that the compass can be secured to the user's wrist.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. A portable, hand-held bearing compass for taking bearings during the day and at night comprising: a hollow housing; a magnetic compass mounted in said housing, said compass having a compass card mounted for rotation about a vertical axis; a viewing window provided in said housing through which compass readings can be taken; a sighting barrel having an eyepiece, said barrel being associated with said housing for viewing a distant object along a horizontal sighting path; a reticle mounted within said housing offset from said sighting path; manually activated means for illuminating said reticle; a semi-reflective mirror positioned within said sighting barrel across said sighting path, said mirror being angled to reflect the image of said illuminated reticle along said sighting path towards said eyepiece while permitting a distant object to be viewed along said sighting path through said eyepiece; means for continuously clamping said compass card in the absence of reticle illumination; and means for unclamping said compass card in response to the manual activation of said reticle illumination means.

2. A bearing compass according to claim 1 wherein said viewing window is provided in the upper portion of said housing.

3. A bearing compass according to claim 1 wherein said sighting barrel is incorporated within said housing.

4. A bearing compass according to claim 1 wherein said reticle illumination means is a light-emitting diode.

5. A bearing compass according to claim 4 wherein said light-emitting diode emits light having a wave length longer than green light and said mirror has a dichroic coating which reflects light having a wave length longer than green light to a greater extent than it reflects light of shorter wave lengths.

6. A bearing compass according to claim 3 wherein said reticle illumination means is a light-emitting diode.

7. A bearing compass according to claim 1 further comprising manually activated means for illuminating said compass card.

8. A bearing compass according to claim 1 further comprising filter means for altering the contrast between the reticle image and the distant object image as viewed through said eyepiece, said filter means being manually movable between an operative position across said sighting path and an inoperative position offset from said sighting path, said mirror being located between said eyepiece and said operative position.

9. A portable, hand-held bearing compass for taking bearings during the day and at night comprising: a hollow housing; a magnetic compass mounted in said housing, said compass having a compass card mounted for rotation about a vertical axis; a viewing window provided in said housing through which compass readings can be taken; a sighting barrel having an eyepiece, said barrel being joined to said housing for viewing a distant object along a horizontal sighting path; a reticle mounted within said housing offset from said sighting path; manually activated means for illuminating said reticle; a semi-reflective mirror positioned within said sighting barrel across said sighting path, said mirror being angled to reflect the image of said illuminated reticle along said sighting path towards said eyepiece while permitting a distant object to be viewed along said sighting path through said eyepiece; clamping means movable between two positions, one position clamping said compass card, the other position unclamping said compass card, means biasing said clamping means to its clamping position, and means responsive to said manually activated illuminating means to move said clamping means to its unclamping position when said reticle is illuminated.

* * * * *